US009813699B2

(12) United States Patent
Amino et al.

(10) Patent No.: US 9,813,699 B2
(45) Date of Patent: Nov. 7, 2017

(54) METHOD AND APPARATUS FOR DISPLAYING A MARKER

(75) Inventors: Yuji Amino, Yokohama (JP); Yoshihiro Sakamoto, Yokohama (JP)

(73) Assignee: Leader Electronics Corp., Yokohama-shi, Kanagawa (JP)

( * ) Notice: Subject to any disclaimer, the term of this patent is extended or adjusted under 35 U.S.C. 154(b) by 0 days.

(21) Appl. No.: 14/401,831

(22) PCT Filed: May 18, 2012

(86) PCT No.: PCT/JP2012/062769
§ 371 (c)(1),
(2), (4) Date: Nov. 17, 2014

(87) PCT Pub. No.: WO2013/171891
PCT Pub. Date: Nov. 21, 2013

(65) Prior Publication Data
US 2015/0146013 A1    May 28, 2015

(51) Int. Cl.
H04N 17/00 (2006.01)
H04N 17/02 (2006.01)
H04N 17/04 (2006.01)

(52) U.S. Cl.
CPC .......... *H04N 17/004* (2013.01); *H04N 17/02* (2013.01); *H04N 17/045* (2013.01)

(58) Field of Classification Search
CPC ...... H04N 17/00; H04N 17/02; H04N 17/004; H04N 17/045; G01R 13/208
USPC ........................................................ 348/185
See application file for complete search history.

(56) References Cited

U.S. PATENT DOCUMENTS

| 3,337,684 A | * | 8/1967 | Sadler | .................... H04N 17/00 324/88 |
| 5,880,722 A | | 3/1999 | Brewer et al. | |
| 6,069,607 A | * | 5/2000 | Everett | .................. H04N 7/012 345/440.1 |
| 6,504,551 B1 | * | 1/2003 | Takashima | ............... H04N 9/74 345/590 |
| 6,532,024 B1 | * | 3/2003 | Everett | .................. H04N 7/012 345/440 |

(Continued)

FOREIGN PATENT DOCUMENTS

| CN | 101815173 A | 8/2010 |
| CN | 102118561 A | 7/2011 |

(Continued)

OTHER PUBLICATIONS

International Search Report from International Application No. PCT/JP2012/062769, dated Aug. 7, 2012, 2 pages (English translation).

(Continued)

*Primary Examiner* — Michael Lee
(74) *Attorney, Agent, or Firm* — Klarquist Sparkman, LLP

(57) ABSTRACT

A marker generating method is provided for facilitating the finding of positions which correspond to one another among a plurality of images associated with a video signal. A position within an image (800) associated with a video signal is selected, with a cursor (802, 804) to display a marker (812, 822-826) at a position corresponding to the selected position, in a different image (810, 820) associated with the video signal.

11 Claims, 12 Drawing Sheets

(56) References Cited

U.S. PATENT DOCUMENTS

| | | | | |
|---|---|---|---|---|
| 2004/0218044 A1* | 11/2004 | Baker | ............... | H04N 17/02 |
| | | | | 348/186 |
| 2005/0219267 A1 | 10/2005 | Hollowbush et al. | | |
| 2007/0046822 A1 | 3/2007 | Arisaka | | |
| 2009/0306514 A1* | 12/2009 | Imamura | ............... | A61B 8/14 |
| | | | | 600/458 |
| 2011/0007948 A1* | 1/2011 | Oldroyd | ............... | G01C 11/00 |
| | | | | 382/106 |
| 2012/0206475 A1* | 8/2012 | Bryant | ............... | G11B 27/034 |
| | | | | 345/589 |

FOREIGN PATENT DOCUMENTS

| | | |
|---|---|---|
| JP | H04-045690 A | 2/1992 |
| JP | H04-192789 A | 7/1992 |
| JP | H11-027688 A | 1/1999 |
| JP | 2002-016948 A | 1/2002 |
| JP | 2008-022390 A | 1/2008 |
| JP | 2010-002404 A | 1/2010 |
| JP | 53338191 B2 | 1/2010 |

OTHER PUBLICATIONS

Extended European Search Report from European Application No. 12877073.2, dated Feb. 11, 2016, 7 pages.
Notification of the First Office Action from Chinese Patent Application No. 201280073248.X, dated Feb. 2, 2016, 19 pages (with English translation).
Notice of Reason for Rejection from Japanese Patent Application No. 2014-515438, dated Jan. 28, 2016, 6 pages (with English translation).
Office Action from Taiwan Patent Application No. 102115709, dated Jan. 12, 2016, 15 pages (with English translation).

\* cited by examiner

METHOD AND APPARATUS FOR DISPLAYING A MARKER

CROSS REFERENCE TO RELATED APPLICATIONS

This is the U.S. National Stage of International Application No. PCT/JP2012/062769, filed May 18, 2012, which is hereby incorporated by reference in its entirety.

TECHNICAL FIELD

The present invention relates to a method and apparatus for displaying a marker on an image associated with a video signal.

BACKGROUND ART

In sites where television programs and video are produced, a waveform monitor, a vector scope, and the like have been conventionally employed to adjust a gain and offset of a camera. In the adjustment, a particular image captured by a camera (for example, turf in a live golf program, a face of a person in a talk show, or the like) is used as a basis for adjustment of the camera.

SUMMARY OF THE INVENTION

Problems to be Solved by the Invention

Recent monitors related to video signals have a function of a vector scope in addition to a function of a waveform monitor, so that they provide for vector display of the video signals in addition to picture display and waveform display of the video signals. Since these vector display, picture display, and waveform display represent the same video signal while changing a format thereof, it can be difficult to associate images provided in the different representations with one another. Specifically, a picture display involves displaying a captured image as it is, i.e., a raster image in the form of a frame composed of horizontal lines. The waveform display in turn involves displaying a magnitude of various signal components included in the video signal on a time basis. The vector display involves drawing with use of values of two color difference signals (Cb and Cr) extracted from the video signal as a horizontal input and a vertical input, respectively, and displaying a trace of the tip of a vector defined by these color difference signals. Accordingly, an image based on the picture display can be correlated to an image based on the waveform display, though roughly, in regard to positions within the different images by using a time of a video signal. However, for an image based on a vector display a time of a video signal cannot be relied on to identify a position within the vector display image. As a result, even if the same video signal is provided in differently displayed images, it is not easy and may be very difficult to precisely identify a part in one of the images that corresponds to a part in another of the images.

A guide signal generator is disclosed in Japanese Patent Application Public-Disclosure No. 2002-16948 as a prior art relevant to a monitor related to video signals. The guide signal generator displays on a vector scope a guide signal indicative of a range of colors to be detected, selects and extracts a particular portion (for example, a skin area of a person) of the image displayed on a picture monitor with a window marker, and supplies the extracted portion to the vector scope, thereby making it possible to compare the color range set by the guide signal with a distribution of actual colors in the extracted image portion. However, even with this prior art, it is not possible to determine with ease where an arbitrary point on an image displayed on the picture monitor corresponds to in an image in a different format of the video signal.

In view of the foregoing problems, the present invention provides a method and apparatus for generating a marker which facilitates finding corresponding positions among a plurality of images associated with a video signal.

The present invention also provides a computer program and a computer readable storage medium associated with the generation of the marker.

Means for Solving the Problem

A variety of aspects and embodiments below will be described and explained in regard to methods and apparatus. However, these aspects and embodiments are provided merely for illustrative and explanatory purposes, and thus the scope of the invention is not limited thereto. While some of the embodiments reduce or eliminate one or more of the problems described above, other of the embodiments are directed to other improvements.

A marker display method according to one aspect of the present invention comprises: selecting a position in a first image associated with a video signal; and displaying a marker at a position corresponding to the selected position in a second image associated with the video signal, the second image being different from the first image.

Also, a computer-readable storage medium according to one aspect of the present invention comprises computer-readable instructions stored thereon for causing a computer to execute the marker display method.

Also, a computer program according to one aspect of the present invention causes a computer to execute the marker display method.

Further, an apparatus for displaying a marker according to one aspect of the present invention comprises: a selector circuit that selects a position in a first image associated with a video signal, the first image being displayed on a display device; and a marker generator circuit that generates a marker at a position corresponding to the selected position, in a second image associated with the video signal, the second image being different from the first image, the display device displaying the second image and the marker.

In addition to the illustrative embodiments and aspects described above, other embodiments and aspects will become apparent to those skilled in the art with reference to the accompanying drawings or with consideration of the following description.

MODE FOR CARRYING OUT THE INVENTION

Several embodiments of the present invention will hereinafter be described in detail with reference to the accompanying drawings.

Figure 1:
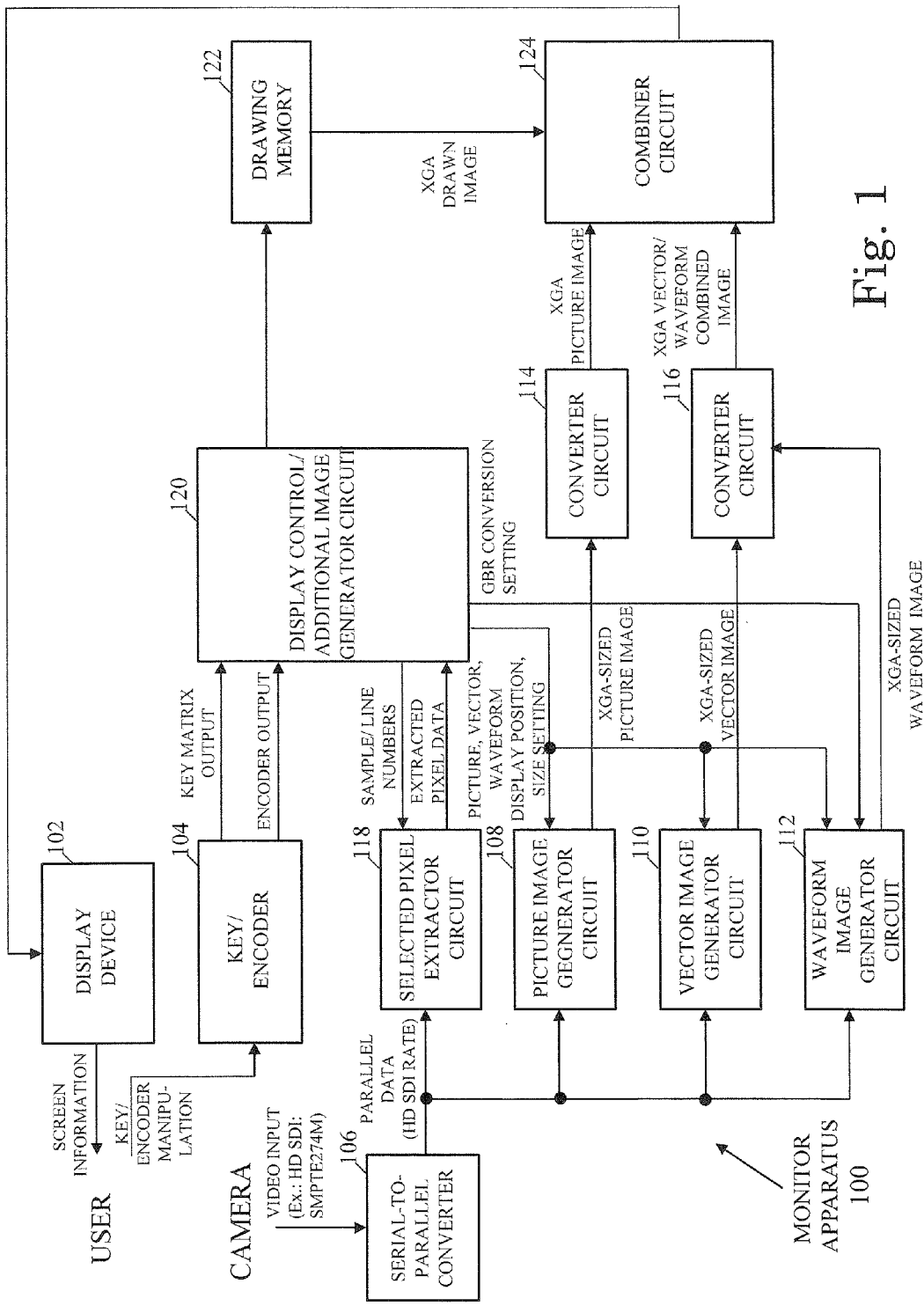
FIG. 1 is a block diagram showing a video signal monitor apparatus according to one embodiment of the present invention.

FIG. 1 shows in a block diagram a video signal monitor apparatus 100 according to one embodiment of the present invention. The monitor apparatus 100 comprises a display device 102, a key/encoder circuit 104, a serial-to-parallel convertor 106, a picture image generator circuit 108, a vector image generator circuit 110, a waveform image generator circuit 112, a converter circuit 114, a converter circuit 116, a selected pixel extractor circuit 118, a display control/additional image generator circuit 120, a drawing memory 122, and a combiner circuit 124. The display device 102 and key/encoder circuit 104 together act as a position selection part for selecting a position for a marker which is generated in accordance with one embodiment of the present invention. The serial-to-parallel converter 106, image generator circuits 108, 110, 112, and converter circuits 114, 116 together act as a video signal image generation part for generating images of a video signal for which a marker is displayed. The selected pixel extractor circuit 118, display control/additional image generator circuit 120, and drawing memory 122 together act as a display control/additional image generation part for performing display control of images of the video signal associated with the marker, and generation of the marker as an additional image. The combiner circuit 124 acts as a combination part for combining the marker with an image of a video signal to which the marker should be added.

In this embodiment, the circuits 108, 110, 112, 114, 116, 118, 124 are comprised of FPGA. The display control/additional image generator circuit 120 is implemented by a computer and a computer program. It should be noted that a variety of circuits in the monitor apparatus 100 of this embodiment may also be implemented entirely in hardware, or by a combination of a computer with software.

Figure 2:
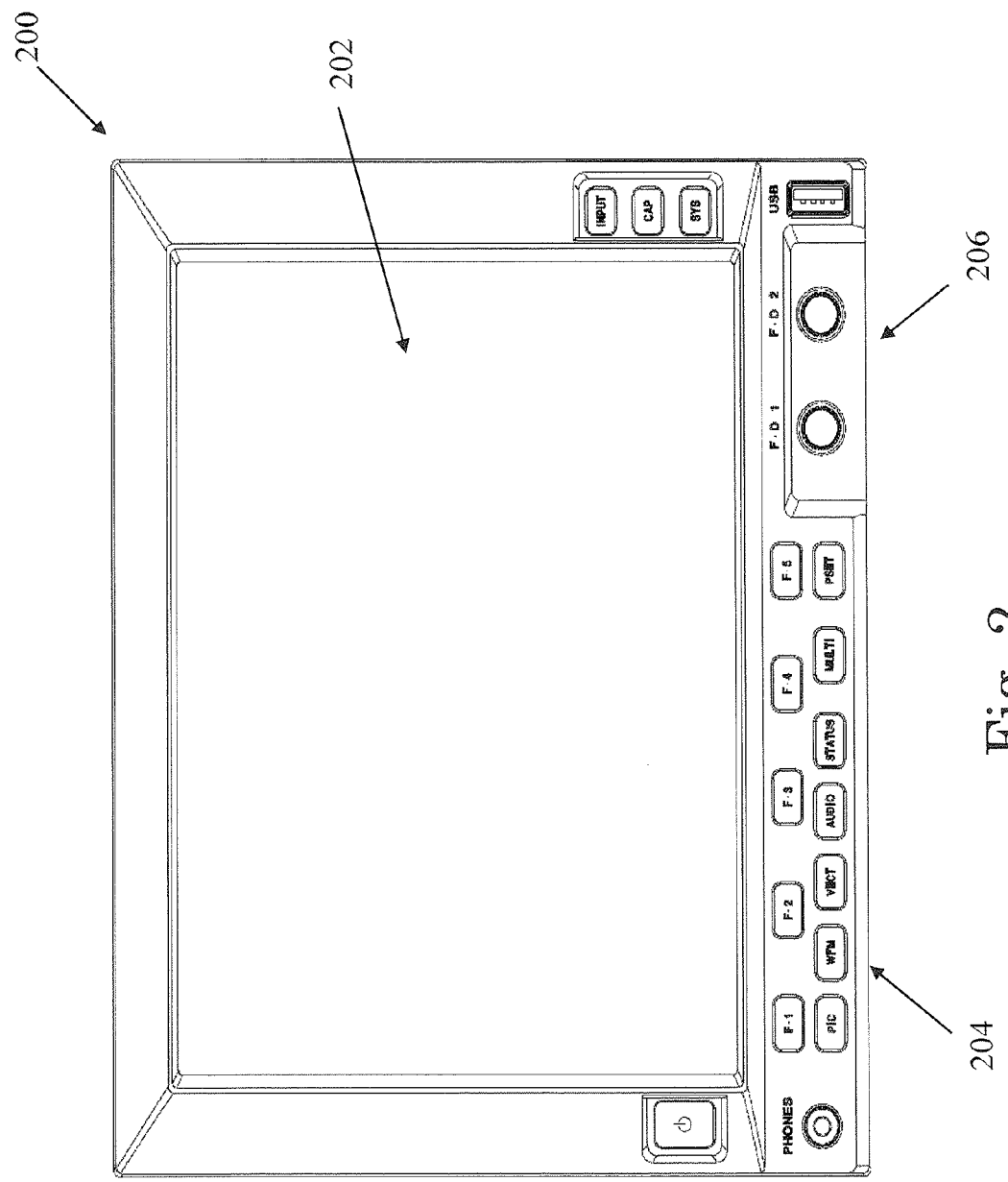
FIG. 2 is a front view showing a front panel of the monitor apparatus in FIG. 1.

Next, the position selection part will be described. With reference to FIG. 2 which shows a front panel 200 of the monitor apparatus 100 as well as FIG. 1, the display device 102 comprises an input for receiving a combined image signal from the combiner circuit 124, and a screen 202 for displaying an image at a resolution of XGA to a user in response to the image signal received at the input. The key/encoder circuit 104 comprises a key matrix 204 for manipulating the monitor apparatus 100, and encoder knobs 206. As illustrated, the key matrix 204 has function keys F-1-F-5, and other keys PIC, WFM, VECT, MULTI, etc., while the encoder knobs 206 comprise a pair of knobs (F.D1, F.D2) for manipulating a horizontal cursor and a vertical cursor.

Now, description will be given only of keys associated with the present invention. Keys PIC, WFM, VECT, MULTI are provided as keys for specifying one of display modes for the monitor apparatus 100. The PIC key specifies a picture display mode which, when selected, displays a raster image formed by a video signal as a "picture image." The WFM key specifies a waveform display mode which, when selected, displays an image indicative of temporal variations in components included in the video signal as a "waveform image." The VECT key specifies a vector display mode which, when selected, displays an image similar to that displayed on a conventional vector scope as a "vector image." In other words, in the vector image, the values of two color difference signals (Cb and Cr) extracted from the video signal are used as a horizontal input and a vertical input, respectively, for drawing and displaying a trace of the end point of the vector defined by these color difference signals. The MULTI key is a key for specifying a multi-screen mode which, when selected, displays the picture image, waveform image, and vector image simultaneously on the single screen. It should be noted that when the multi-screen mode is not selected, the monitor apparatus operates in a single screen mode.

The key/encoder circuit 104 is responsive to a user's manipulation key input to generate a key matrix output indicative of a key that has been depressed, and is responsive to manipulation of the encoder knobs 206 to generate an encoder output indicative of the manipulation. The user can move the cursors on the image while viewing the image on the screen 202. The encoder may comprise a rotary encoder, in which case, the encoder detects pulses outputted by the rotary encoder, and generates an encoder output derived by updating data indicative of the manipulation direction and the traveling distance of the encoder.

Describing next the video signal image generation part, the serial-to-parallel converter 106 of the monitor apparatus 100 has an input for receiving a video signal from a camera, for example, an HD SDI signal (SMPTE274M Standard), and converts the received HD SDI signal in a serial form into a parallel video signal having an HD SDI rate which in turn is delivered to an output. It should be noted that although this embodiment is described in relation to the HD SID signal (SMPTE274M standard) as an example, the present invention is applicable to any video signal conforming to other standards (for example, a variety of video standards such as SD-SDI, 3G-SDI, HDMI, Display Port, and the like).

Next, the picture image generator circuit 108, vector image generator circuit 110, and waveform image generator circuit 112 each have inputs for receiving an output from the serial-to-parallel converter 106, and inputs for receiving a display position/display size setting output from the display control/additional image generator circuit 120, which will be described in detail later. The waveform image generator circuit 112 further has an input for receiving a GBR conversion command from the display control/additional image generator circuit 120. The image generator circuits 108, 110, 112 respectively generate images in different formats, which are associated with a received video signal and that follow the received display position and display size settings.

Describing in greater details, the picture image generator circuit 108 generates an active picture image from the input parallel data excluding blanking intervals, converts the generated picture image to a picture image at the XGA resolution in order to conform to the format of the display device 102, scales down the generated picture image after the conversion in accordance with a set display size, shifts the scaled-down image to a set display position, and generates the resulting picture image of XGA size. The picture image thus generated is included in the image shown in FIG. 4. It should be noted that the image generator circuit 108 masks the picture image output, i.e., does not generate the picture image at the output in display modes which do not require the picture image.

The vector image generator circuit 110 excludes blanking intervals from the input parallel data, converts the input parallel data excluding the blanking intervals into a vector image of a vector display coordinate system, rasterizes the vector image, converts the rasterized vector image further into an image at the XGA resolution in order to conform to the format of the display device, scales down the converted vector image to a set display size, shifts the scaled-down image so as to be displayed at a set display position, and generates the resulting vector image of XGA size. The generated vector image is included in the image shown in FIG. 5. It should be noted that the vector image generator circuit 110 masks the vector image output in display modes which do not require the vector image.

Figure 7:
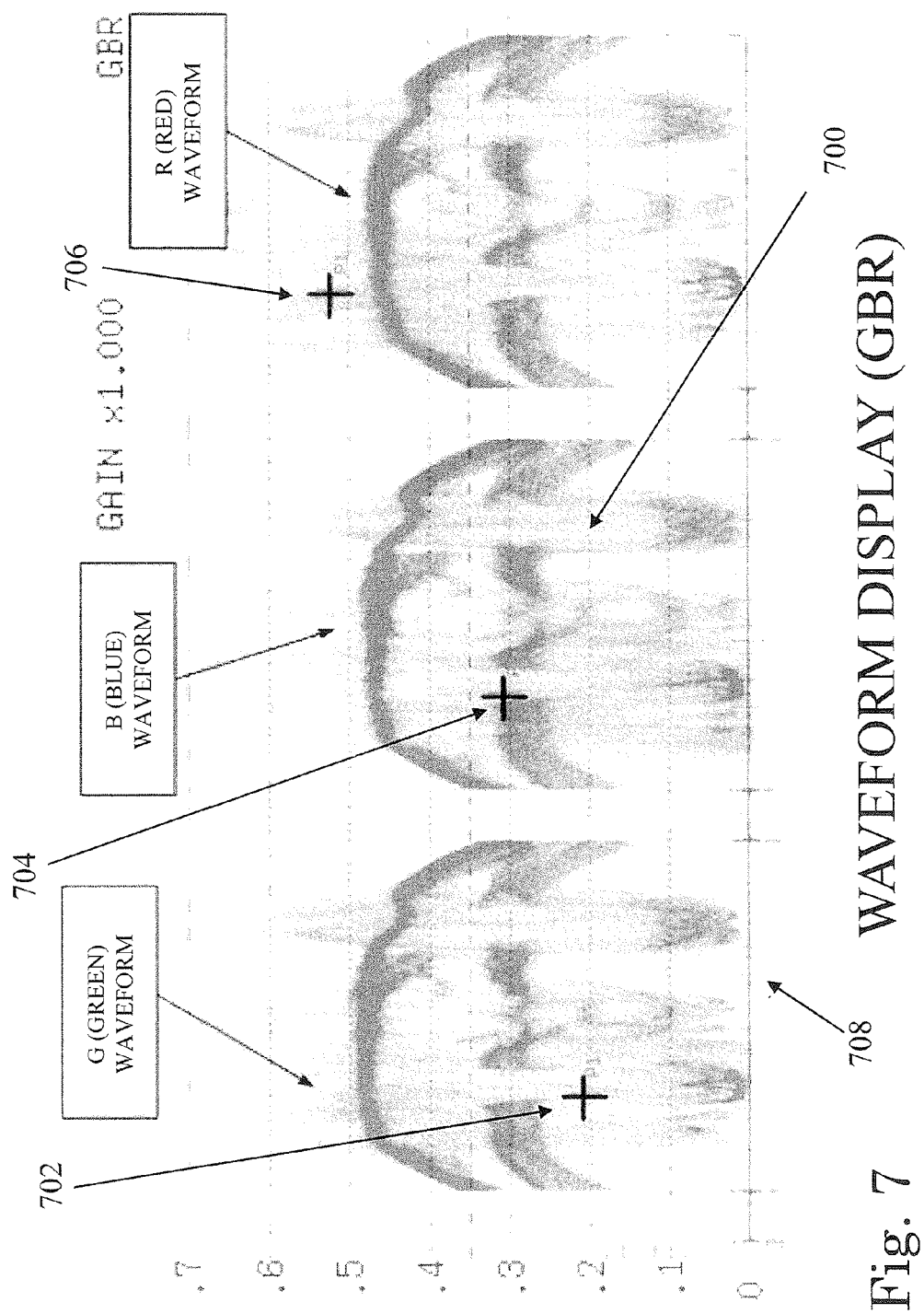
FIG. 7 is a diagram showing an example of another waveform image including a marker, displayed on the screen of the monitor apparatus.
Figure 8:
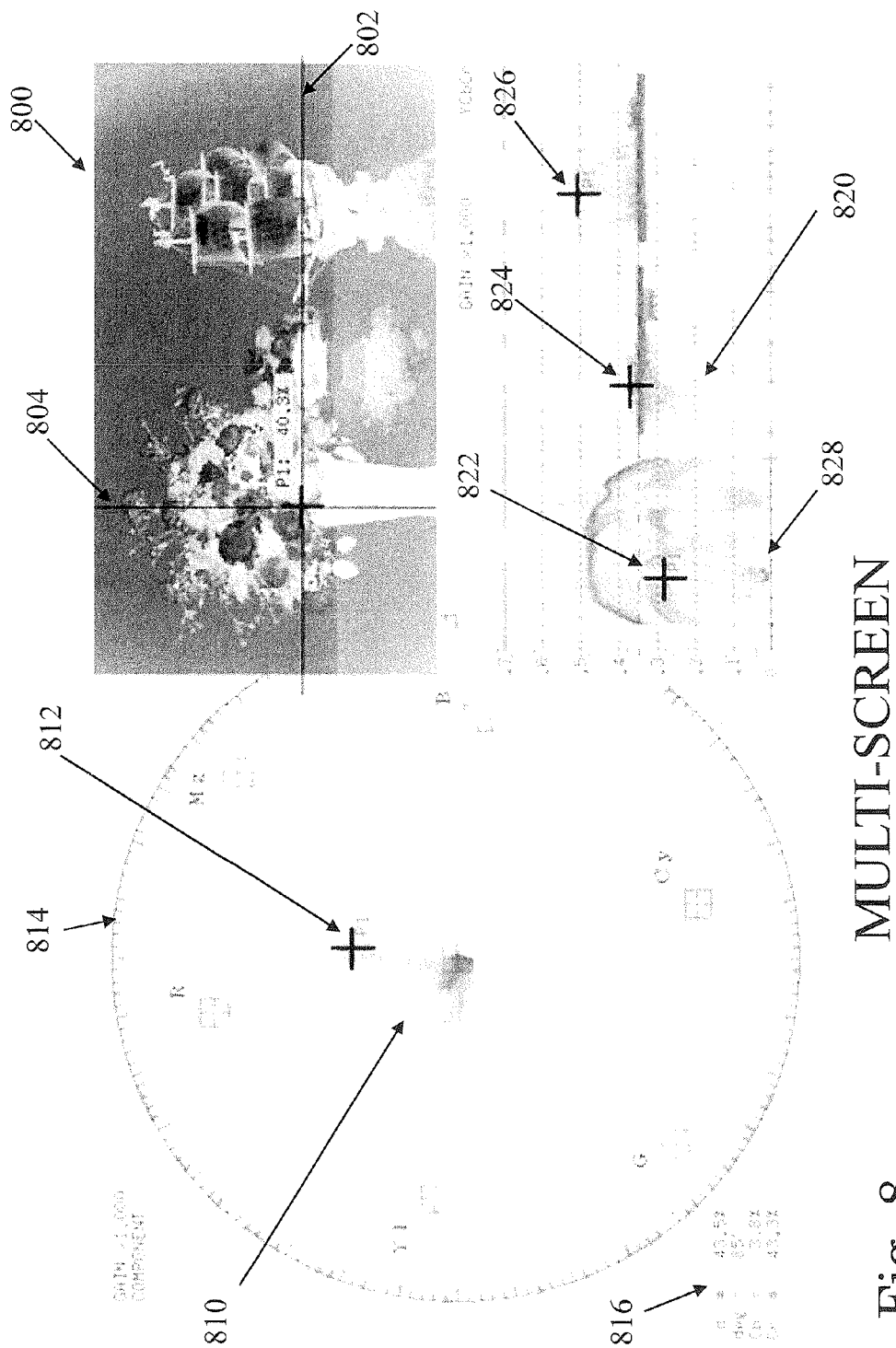
FIG. 8 is a diagram showing an example of an image including a marker in a multi-screen mode displayed on the screen of the monitor apparatus.

The waveform image generator circuit 112 converts input parallel data from the serial-to-parallel converter 106 into three waveforms including a Y (luminance) signal and color difference signals Cb and Cr (G (green) signal, B (blue) signal, and R (red) signal for GBR display), rasterizes the three waveforms into a single image, converts the rasterized image into an image at the XGA resolution in order to conform to the format of the display device, scales down the converted image to a set display size, shifts the scaled-down image so as to be displayed at a set display position, and generates the resulting waveform image of XGA size. The generated waveform image is included in an image shown in FIG. 6 or FIG. 7. The image generator circuit 112 masks the waveform image output in display modes which do not require the waveform image. FIG. 8 shows an image including the picture image, waveform image, and vector image.

The converter circuit 114 has an input connected to the output of the picture image generator circuit 108. The converter circuit 114 converts the frame rate of a received picture image so that it has the XGA rate by performing a picture frame rate conversion, and subsequently generates the converted XGA picture image to its output. Similarly, the converter circuit 116 has an input connected to the output of the vector image generator circuit 110, and an input connected to the output of the waveform image generator circuit 112. The converter circuit 116 combines a vector image with a waveform image, converts the frame rate of the combined image to the XGA rate to conform it to the format of the display device, and generates the converted XGA vector/waveform combined image to its output.

Next, describing the display control/additional image generation part, the display control/additional image generator circuit 120 has inputs connected to the outputs of the key/encoder circuit 104, and reads a key matrix output and an encoder output from the key/encoder circuit by polling, thereby determining a display mode from a manipulated key. The circuit 120 also calculates from the output of the manipulated encoder a sample number and a line number of an input video based on the format of the input video signal, and outputs them. Initial positions of cursors on a picture image are set at particular positions in the picture image, and the current positions of the cursors are determined from the initial positions based on the output of the encoder. For example, when an input video signal has a format of HD SDI 1080i/59.94, a number of lines per frame is 1,080; and a number of samples per line is 1,920, in which case, initial positions of the cursors are defined by Line 1 and Sample Number 1920.

The selected pixel extractor circuit 118 has an input connected to the output of the serial-to-parallel converter 106, and an input connected to the output of the display control/additional image generator circuit 120. The selected pixel extractor circuit 118 monitors received input parallel data for the sample number and line number by detecting synchronization signals from the parallel data, and extracts a pixel of the parallel data corresponding to the sample number and line number received from the display control/additional image generator circuit 120. The selected pixel extractor circuit 118 also detects a luminance value Y and color difference values Cb and Cr of the extracted pixel, updates these values, and generates the updated values together with the extracted pixel as extracted pixel data.

The display control/additional image generator circuit 120, which has an input for receiving the extracted pixel data, acquires the luminance value Y and color difference values Cb and Cr from the extracted pixel data. The circuit 120 also sets display sizes and positions for a picture image, a vector image, and a waveform image in accordance with a determined display mode. Specifically, for the single screen mode which displays only one image on the screen, the circuit 120 sets a display size and position for only an image specified from among the picture image, vector image, and waveform image, such that the specified image is displayed as illustrated in FIGS. 4-7. For the multi-screen mode, the circuit 120 sets the display sizes and positions for the picture image, vector image, and waveform image, such that they are displayed, for example, as illustrated in FIG. 8. The circuit 120 also generates a GBR conversion command when a GBR display is specified in association with the waveform display mode. These settings and command are used by the image generator circuits 108, 110, 112, as described above.

The display control/additional image generator circuit 120 further performs a predetermined calculation process using the extracted pixel data. Specifically, the circuit 120 generates images of cursors to be added to a picture image, and calculates from the extracted pixel data a G value, B value, or R value to be added to the picture image. Alternatively, a Y (luminance) value may be selected for the value to be added to the picture image. Positions at which the cursor images are displayed are defined in accordance with the sample number and the line number as well as the display mode. The display control/additional image generator circuit 120 further calculates positions at which markers and a scale to be added to a waveform image are displayed, in accordance with the extracted image data and display mode, and generates images of the markers to be added to the waveform image. Also, the circuit 120 calculates a Cb % value, Cr % value, saturation percentage value (d), and hue angle (deg), to be added to a vector image, from the extracted pixel data, calculates positions at which a marker and a scale to be added to the vector image are displayed, in accordance with the display mode, and generates an image of the marker to be added to the vector image.

The display control/additional image generator circuit 120 further pedal' is processing for drawing in the drawing memory 122. Specifically, for a picture image, the circuit 120 supplies the G value, B value, and R value, or the luminance value Y (indicative of a percentage value of the luminance value Y in the example in FIG. 4), together with the images of the cursors to the drawing memory 122. For a vector image, the circuit 120 supplies numerical values of the Cb value (%), Cr value (%), saturation d (%), and hue angle (deg), and images of the marker and the scale to the drawing memory 122. For a waveform image, the circuit 120 supplies images of the markers and the scale to be added to the waveform image, to the drawing memory 122. For a multi-screen, images for three images, i.e., a picture image, a vector image, and a waveform image are combined within the drawing memory 122.

The drawing memory 122 has an input for receiving the foregoing data outputted from the display control/additional image generator circuit 120, stores drawn data in accordance with the received data, and delivers an XGA drawn image (including the values, markers, cursors, and scale) from the drawn data at the XGA rate of the display device 102.

Describing the combination part, the combiner circuit 124 has inputs connected respectively to the output of the converter circuit 114, the output of the converter circuit 116, and the output of the drawing memory 122. When the single screen mode is selected, the combiner circuit 124 executes the following processes. When the picture mode is selected, the combiner circuit 124 combines the picture image from the converter circuit 114 with the drawn image from the drawing memory 122, i.e., the images of the cursors, G value, B value or R value to be added to the picture image. In this case, the vector image is masked by the vector image generator circuit 110, and the waveform image is masked by the vector image generator circuit 112. When the waveform display mode is selected, the combiner circuit 124 combines the waveform image from the converter circuit 116 with the drawn images from the drawing memory 122, i.e., the images of the markers and scale to be added to the waveform image. In this event, the picture image is masked by the picture image generator circuit 108, and the waveform image is masked by the waveform image generator circuit 112. When the vector display mode is selected, the combiner circuit 124 combines the vector image from the converter circuit 116 with the drawn images from the drawing memory 122, i.e., the images of the marker, scale, Cb % value, Cr % value, saturation % value (d), and hue angle (deg), to be added to the vector image. In this event, the picture image is masked by the picture image generator circuit 108, and the waveform image is masked by the waveform image generator circuit 112. When the multi-screen mode is selected, the combiner circuit 124 combines the picture, vector, and waveform images, and further combines the combined image with the additional images to be respectively added to the three images. The combiner circuit 124 generates the combined result at the output. The display device 102, which has an input for receiving the output from the combiner circuit 124, displays the received combined image to a user.

Figure 3:
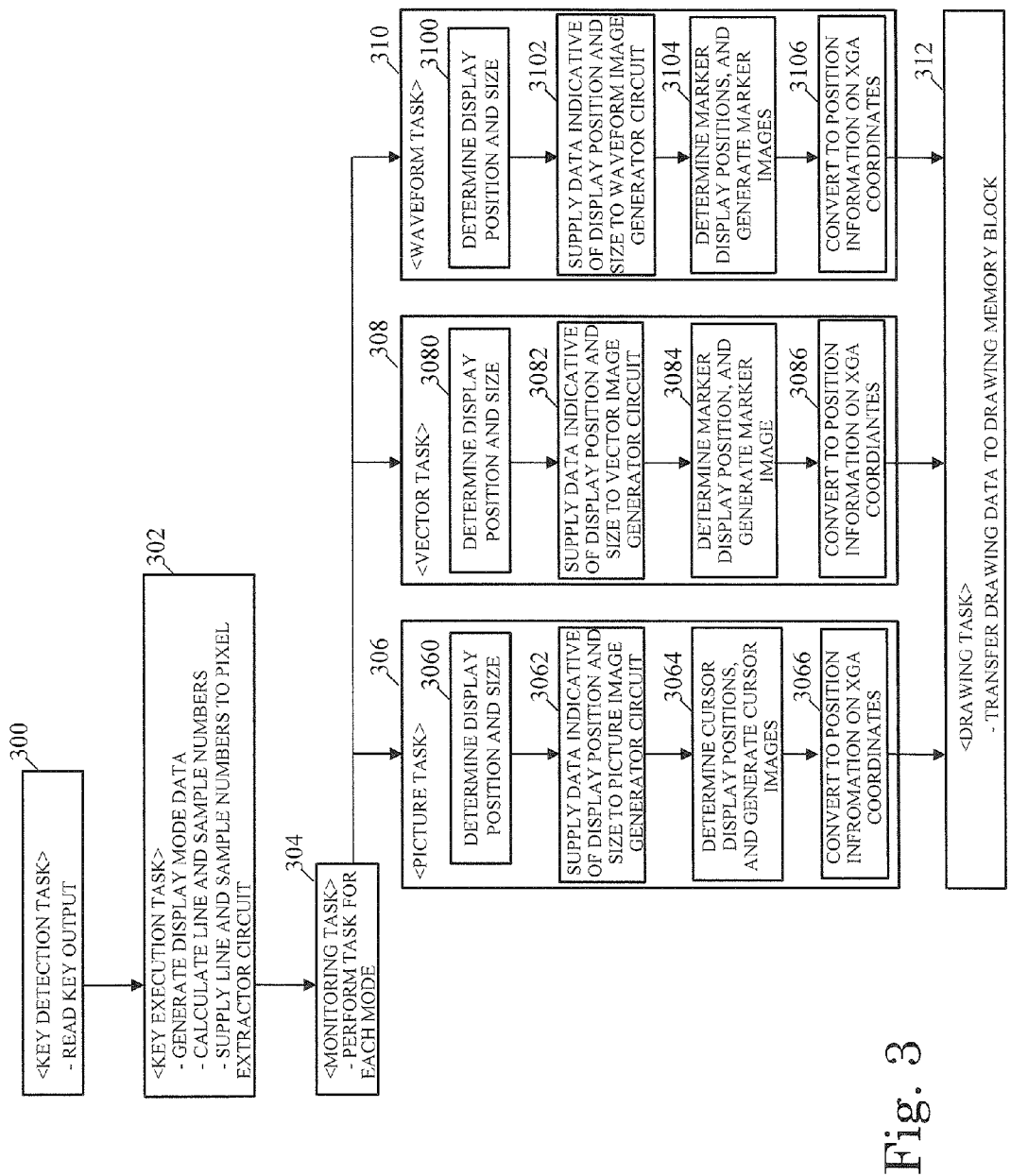
FIG. 3 is a flowchart showing a process executed by a computer which implements a display control/additional image generator circuit illustrated in FIG. 1.

The operation of the display control/additional image generator circuit 120 will now be described with reference to the flowchart of FIG. 3. First, at step 300, the circuit 120 performs a key detection task to read a key matrix output and an encoder output by polling the output from the key/encoder circuit 104. At step 302, the circuit 120 performs a key execution task to generate display mode data and a line number/sample number pair. The display mode data indicates whether the single screen mode or multi-screen mode is selected, and also indicates which of the picture display mode, waveform display mode, and the vector display mode is selected when the single screen mode is selected. When the waveform display mode is selected, the display mode data indicates whether the GBR waveform display is selected or not. The generated line number/sample number pair is supplied to the selected pixel extractor circuit 118 where the aforementioned pixel extraction is performed.

At step 304, the circuit 120 performs a monitoring task, in which the circuit 120 performs one or all of tasks referred to as a "picture task," a "vector task," and a "waveform task," as specified by the display mode data. These tasks are related to the picture image display mode, vector image display mode, and waveform image display mode, respectively.

Figure 4:
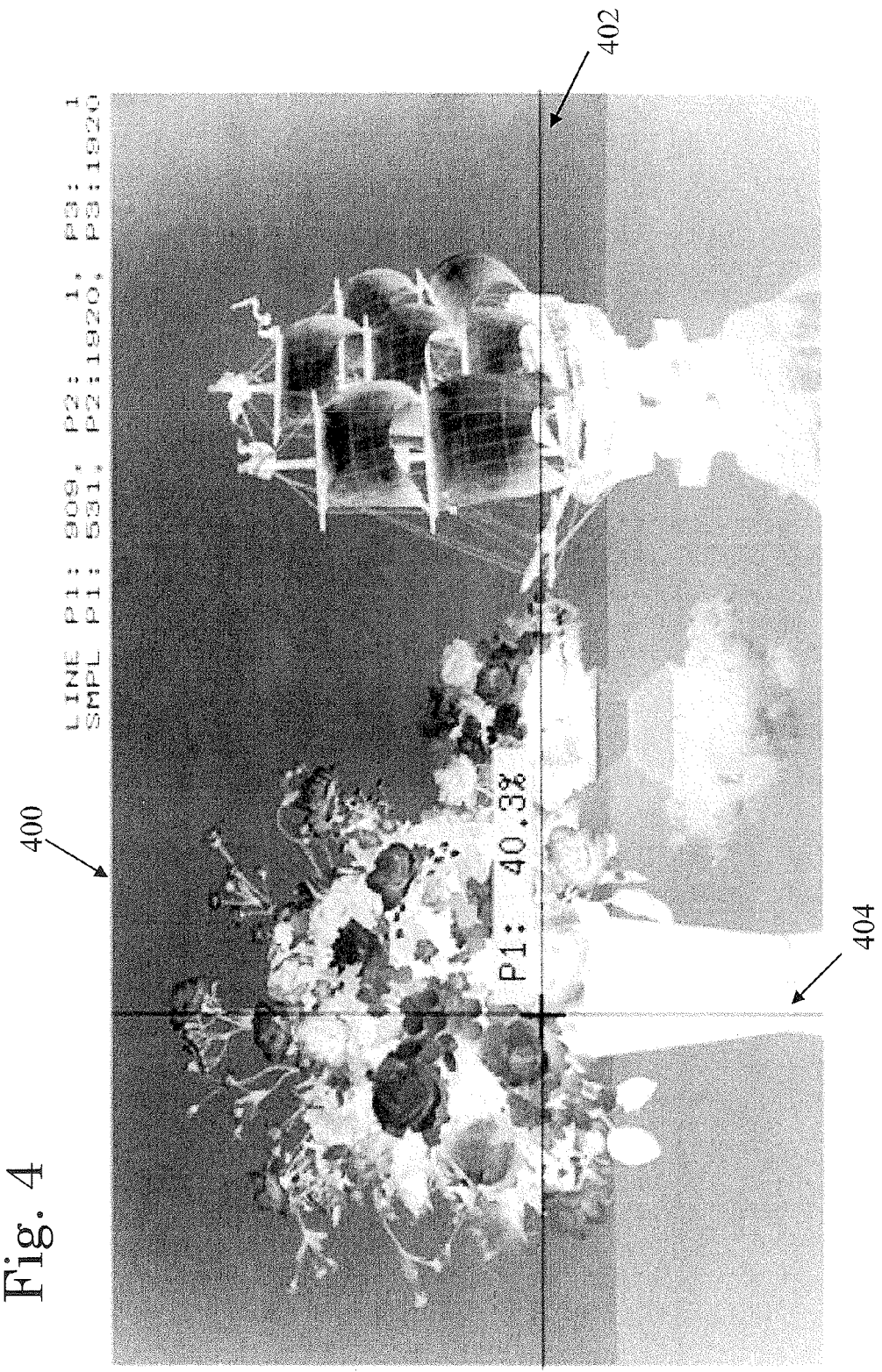
FIG. 4 is a diagram showing an example of a picture image including cursors, displayed on a screen of the monitor apparatus.

At step 306, the circuit 120 performs the picture task. In the picture task, the circuit 120 determines the display position and size of a picture image on a monitor screen 202 from the display mode data (i.e., the single screen mode or multi-screen mode) at step 3060, and supplies the determined results to the picture image generator circuit 108 at step 3062. Next, at step 3064, the circuit 120 determines, from the extracted pixel data, a position at which the cursors are displayed, and generates cursor images. Next, at step 3066, the circuit 120 converts the cursor display positions to positions on the XGA coordinates. Thus, this picture task determines a position and size of a picture image 400 or 800 on the screen 202, as illustrated in FIGS. 4 and 8, and also, determines positions of a horizontal and a vertical cursor 402 and 404 or 802 and 804 on the picture image. It should be noted that FIG. 4 shows a line number and a sample number for a pixel P1 selected by the intersection of the cursors, and a luminance value Y (%), for example, of the pixel near the intersection of the cursors. It should be noted that since this embodiment allows up to three positions to be specified with the cursors, line numbers and sample numbers of pixels P2 and P3 are also shown along the top side, but they are not displayed on the screen because they are outside of the active picture. While the multi-screen in FIG. 8 does not display data related to the pixels P2 and P3, they can be displayed if desired. Switching among the three specified positions with the cursors may be performed, for example, by using a function key.

Next, at step 308, the circuit 120 performs the vector task. In this vector task, the circuit 120 determines from the display mode data a display position and size of a vector image on the monitor screen 202 at step 3080, and supplies these determined results to the vector image generator circuit 110 at step 3082. Next, at step 3084, the circuit 120 calculates the Cb % value, Cr % value, saturation percentage value (d), and hue angle (deg) to be added to the vector image, from the Cb/Cr value received from the selected pixel extractor circuit 118. Further, the circuit 120 determines, in accordance with the display mode (i.e., the single screen mode or multi-screen mode), positions where to display the marker, scale, and values to be added to the vector image, and generates an image of, for example, a cross-shaped marker to be added to the vector image. The marker display position is a position in the vector coordinates for vector display (where the horizontal axis represents the Cb value, and the vertical axis represents the Cr value). Next, at step 3086, the circuit 120 converts the display positions of the marker, scale, and values to positions on the XGA coordinates. This vector task thus results in determining a display position and size of a vector image 500 or 810 on the screen 202, and determining positions of a marker 502 or 812, scale 504 or 814, and value 506 or 816.

Figure 6:
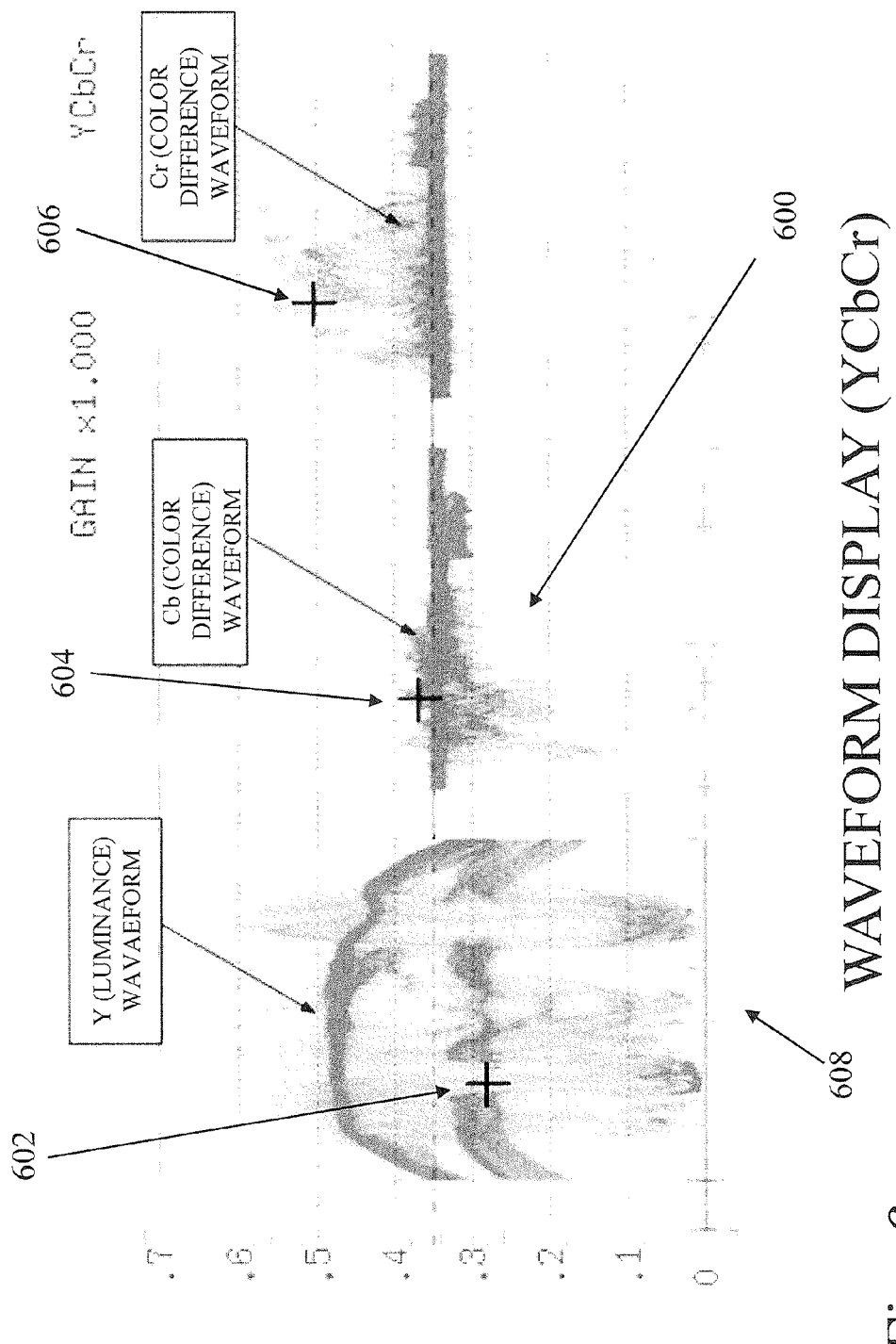
FIG. 6 is a diagram showing an example of a waveform image including a marker, displayed on the screen of the monitor apparatus.

Next, at step 310, the circuit 120 performs the waveform task. In this waveform task, the circuit 120 determines from the display mode data, the display position and size of a waveform image on the monitor screen 202 at step 3100, and supplies these determined results to the waveform image generator circuit 112 at step 3102. When the GBR display is selected for the waveform display, a GBR conversion command is also supplied. Next, at step 3104, the circuit 120 determines, in accordance with the display mode (i.e., the single screen mode or multi-screen mode), positions where to display markers and a scale to be added to the waveform image, and generates the images of, for example, cross-shaped markers to be added to the waveform image. The marker display positions are in the waveform coordinates for waveform display (where the horizontal axis represents a time, and the vertical axis represents a magnitude of each component). Positions of the respective markers on the horizontal axis are determined from the sample number, while positions on the vertical axis are determined by converting the Y value, Cb value, and Cr value received from the selected pixel extractor circuit 118 into percentage values. In this embodiment, waveforms of respective lines are superimposed on one another, but a line number can be specified to display only the specified line without superimposing the waveforms of all lines; alternatively, a line selected on the picture image only can be displayed. Next, at step 3106, the circuit 120 converts the display positions of the markers and scale into positions on the XGA coordinates. As illustrated in FIG. 6 or 8, the waveform task results in determination of a display position and size of a waveform image 600 or 820 on the screen 202, and also determination of positions of markers 602-606 or 822-826 and a scale 608 or 828. In each of FIGS. 6 and 8, the waveform image shows a luminance (Y) waveform, a color difference (Cb) waveform, and a color difference (Cr) waveform, but when the GBR display is selected, a green (G) waveform, a blue (B) waveform, and a red (R) waveform are displayed as a waveform image 700, as shown in FIG. 7. Again, in this event, markers 702-706 and a scale 708 are generated and displayed for each waveform.

Next, at step 312, the circuit 120 performs the drawing task. In this drawing task, the circuit 120 sends the images generated in the picture task, vector task, or waveform task to the drawing memory 122 as drawing data to form an image in the drawing memory.

As described above, the monitor apparatus 100 according to one embodiment of the present invention can display one or more markers within a vector image and/or waveform image by specifying a position within an image of the picture display mode using the cursors. This allows a user to readily find a position corresponding to a position in the same video signal on a plurality of images in different formats. Since a position can be selected with a line number and a sample number, the corresponding positions can be highly precisely identified.

Figure 9:
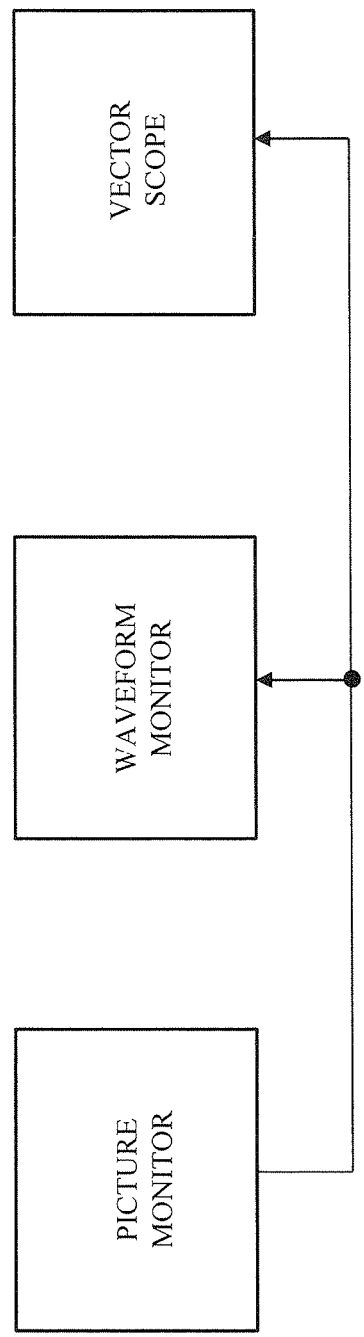
FIG. 9 is a diagram showing an exemplary configuration of a plurality of monitors that display markers.

It should be noted that while the embodiment of the present invention described above is configured to select a position on a picture image, a position can also be selected on a waveform image. Also, while the foregoing embodiment is configured to select a position and display a marker on the same monitor, the present invention is not so limited, selection of a position and display of a marker can be performed on different monitors, respectively. For example, as shown in FIG. 9, a position can be selected on a picture monitor, while one or more markers can be displayed on a waveform monitor or a vector scope. In this event, data indicative of the selected position may be sent from the picture monitor to the other monitors. In such an embodiment, the other monitors may also be provided with the entire circuit illustrated in FIG. 1 or the entire circuit except for the key/encoder circuit 104, such that the other monitors are configured to receive position data from the picture monitor.

Figure 10:
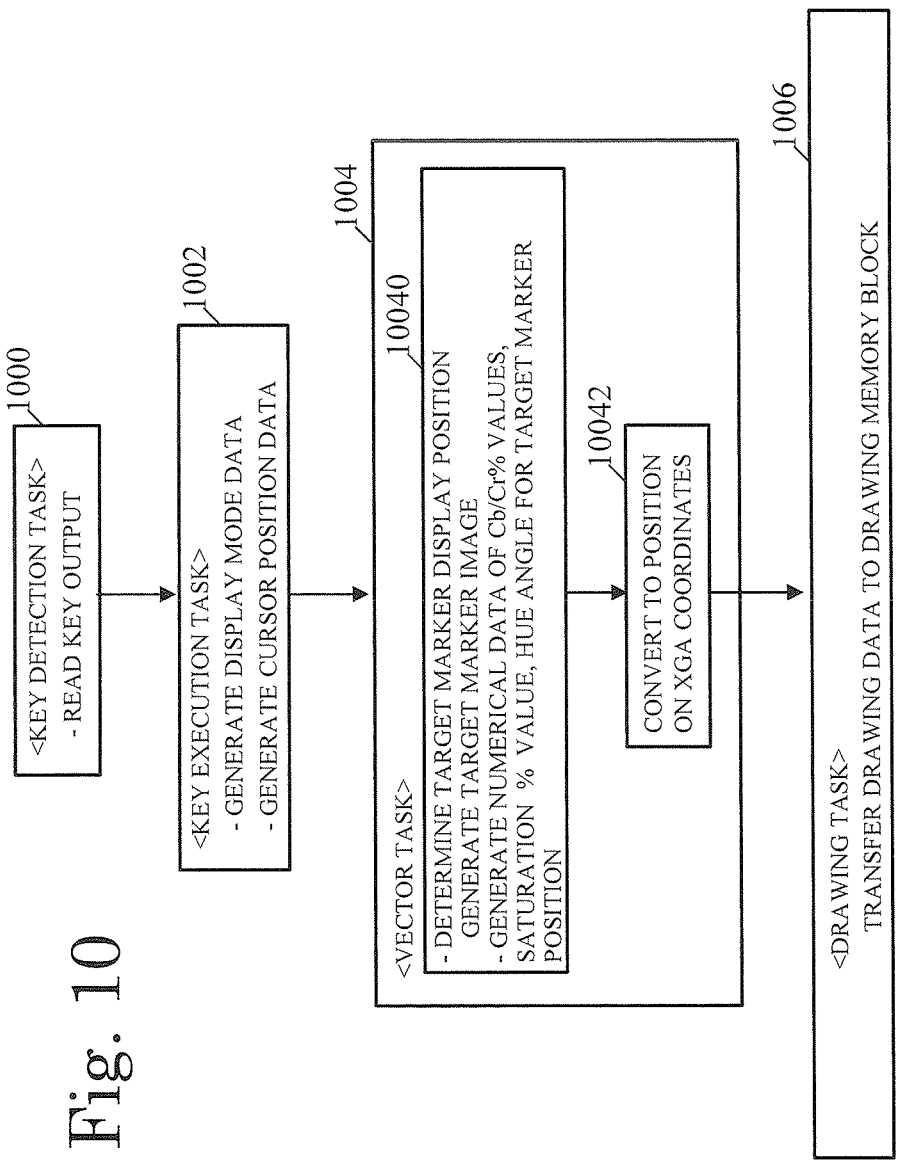
FIG. 10 is a flowchart showing a process for displaying a target marker executed by the computer which implements the display control/additional image generator circuit in FIG. 1.

Next, another feature of the present invention will be described with reference to the flowchart in FIG. 10. This feature relates to displaying an additional marker in addition to the aforementioned one or more markers. In the following description, this additional marker is referred to as the "target marker." It should be noted that the target marker can be displayed even without displaying the aforementioned one or more markers. The process represented by the flowchart in FIG. 10 is implemented by the display control/additional image generator circuit 120 in FIG. 1. The operations of the remaining circuits in FIG. 1 are substantially the same as those described in connection with FIG. 1.

First, at step 1000 in FIG. 10, the circuit 120 performs a key detection task to read a key matrix output and an encoder output by polling. At next step 1002, the circuit 120 performs a key execution task. In this task, the circuit 120 detects that the target marker display has been selected in a state where a vector screen is displayed, and determines a position at which the target marker should be displayed at this point of time. The user can select a position at which the target marker is displayed by moving the horizontal and vertical cursors. It should be noted that the initial positions of the cursors are set at the center of the vector coordinates when the target marker is displayed, and the cursors can be moved to arbitrary positions in the vector coordinates by manipulating the encoder.

At next step 1004, the circuit 120 performs a vector task. In this vector task, the circuit 120 determines at step 10040 a position at which the target marker is displayed, from the display mode (the single display mode or multi-display mode), the display position and display size of a vector image. The position at which the target marker is displayed is a position in the vector coordinates for performing the vector display. Next, the circuit 120 calculates from the position within the vector coordinates the Cb % and Cr % values, saturation percentage value (d), and hue angle (deg) at the position. Next, at step 10042, the circuit 120 converts the target marker display position to a position on the XGA coordinates. At next step 1006, the circuit 120 performs a drawing task through which the image of the target marker and images of values associated therewith are output to the drawing memory 122 as drawing data. Upon receipt of the output, the drawing memory 122 forms therein an image to be added to the aforementioned vector image. It should be noted that the additional images described in connection with FIG. 1 have also been formed in the drawing memory 122 as required, and therefore, the combiner circuit 124, which receives the output from the drawing memory 122, adds the received image related to the target marker to the image in FIG. 5 or 8.

Figure 11:
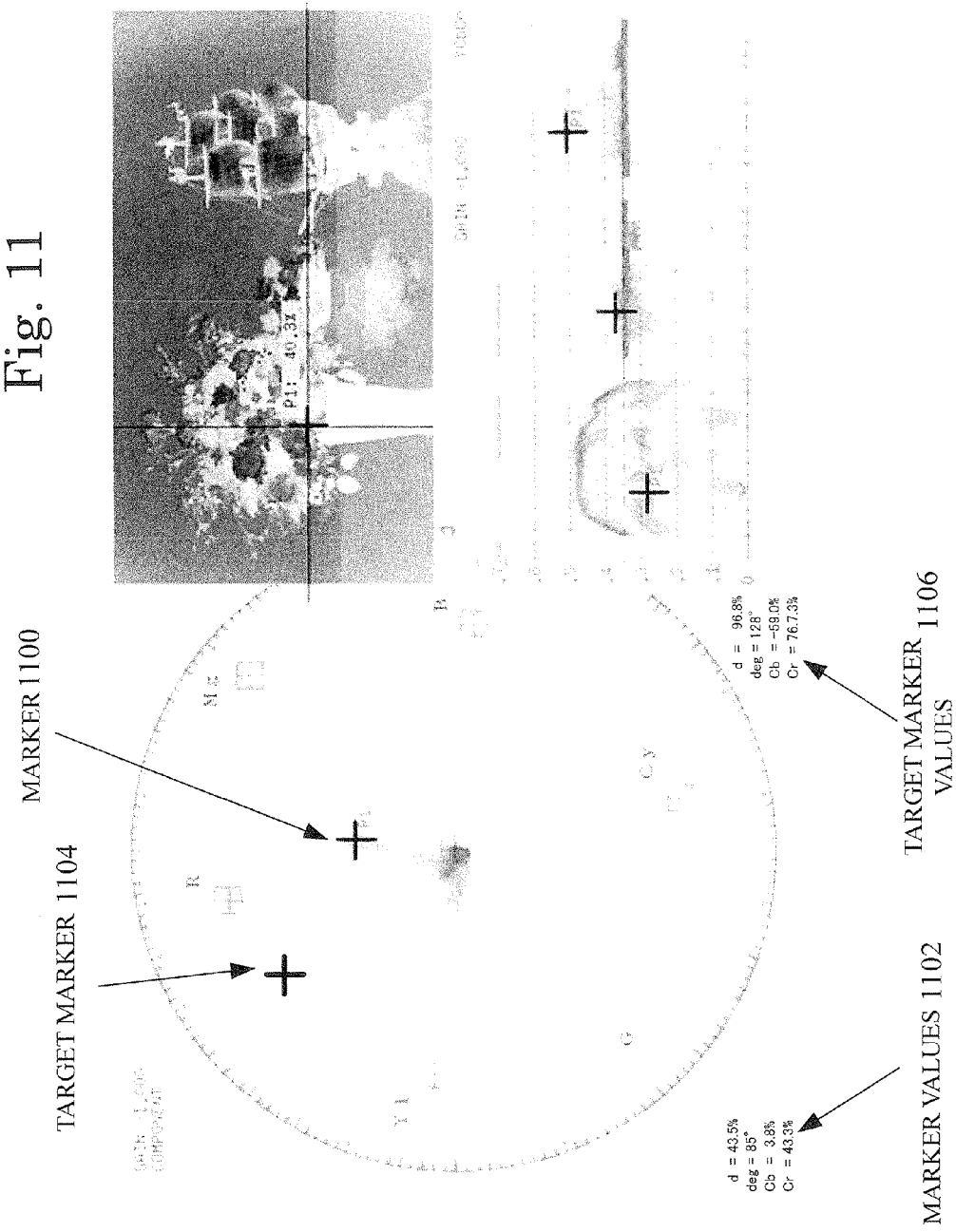
FIG. 11 is diagram showing an exemplary display that includes a target marker added to the image in the multi-screen mode in FIG. 8.

FIG. 11 shows an exemplary display which includes a target marker added to the image in the multi-screen mode in FIG. 8. As illustrated, the target marker 1104 and associated values 1106 are included in addition to the aforementioned marker 1100 and associated values 1102 generated by the configuration of FIG. 1. As described above, the target marker can be displayed at an arbitrary position specified by a user in the vector coordinates.

The target marker can be used in combination with the aforementioned marker. For example, the same object may be imaged by a plurality of cameras in order to make adjustments among the cameras. In this event, receiving first a video signal captured by a first camera, the user specifies, through the configuration of FIG. 1, a position in a picture image to display the marker 1100 within the vector image. Next, the target marker 1104 is moved to the position of the marker 1100, and remains displayed at this position. Next, the monitor apparatus 100 is switched to receive a video signal from a second camera, and then the user specifies a corresponding position in the picture image (the aforementioned position of the object) to display a second marker in the vector image. If the second marker presents a shift from the target marker, this may indicate that the first and second cameras suffer from a discrepancy in adjustment. Also, since both the marker values and target marker values are shown, the user is able to understand which parameter value shifts to what extent. In this way, two cameras can be more readily adjusted to each other than was previously the case, by using the marker and target marker as well as the values associated therewith.

Figure 5:
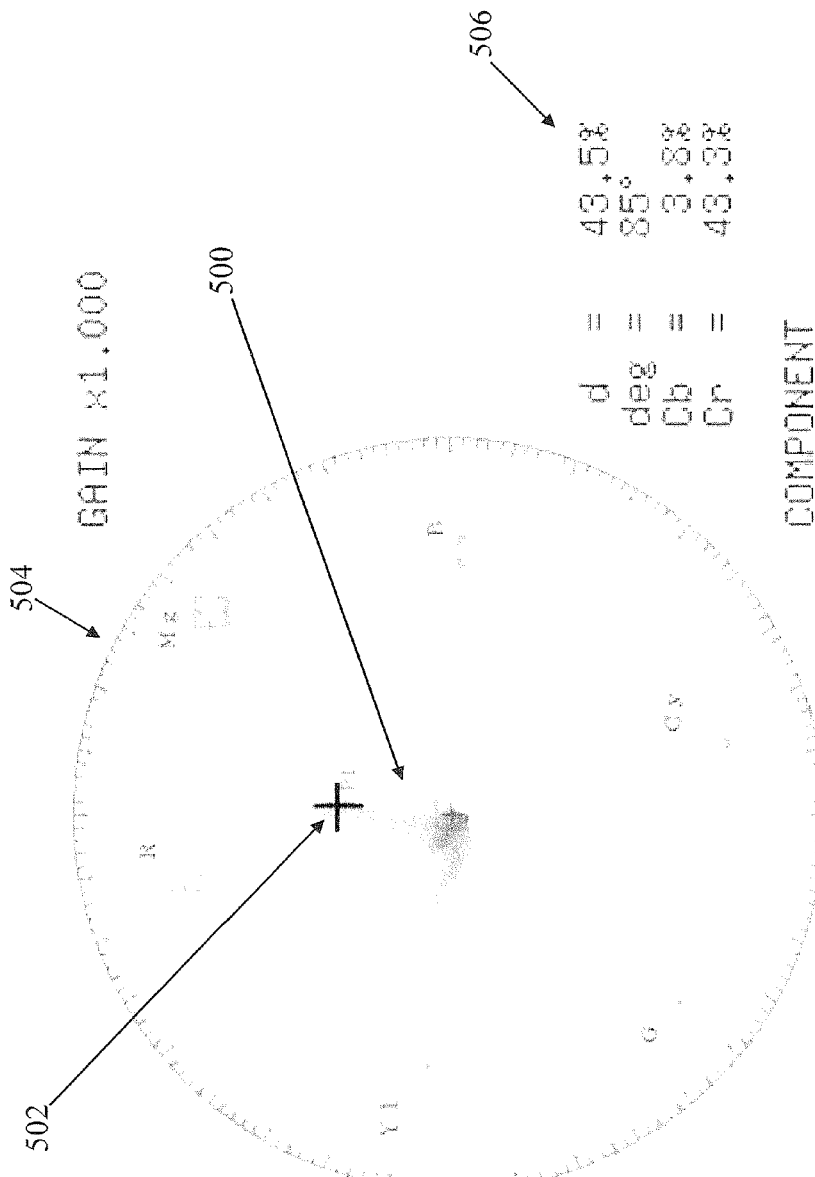
FIG. 5 is a diagram showing an example of a vector image including a marker, displayed on the screen of the monitor apparatus.
Figure 12:
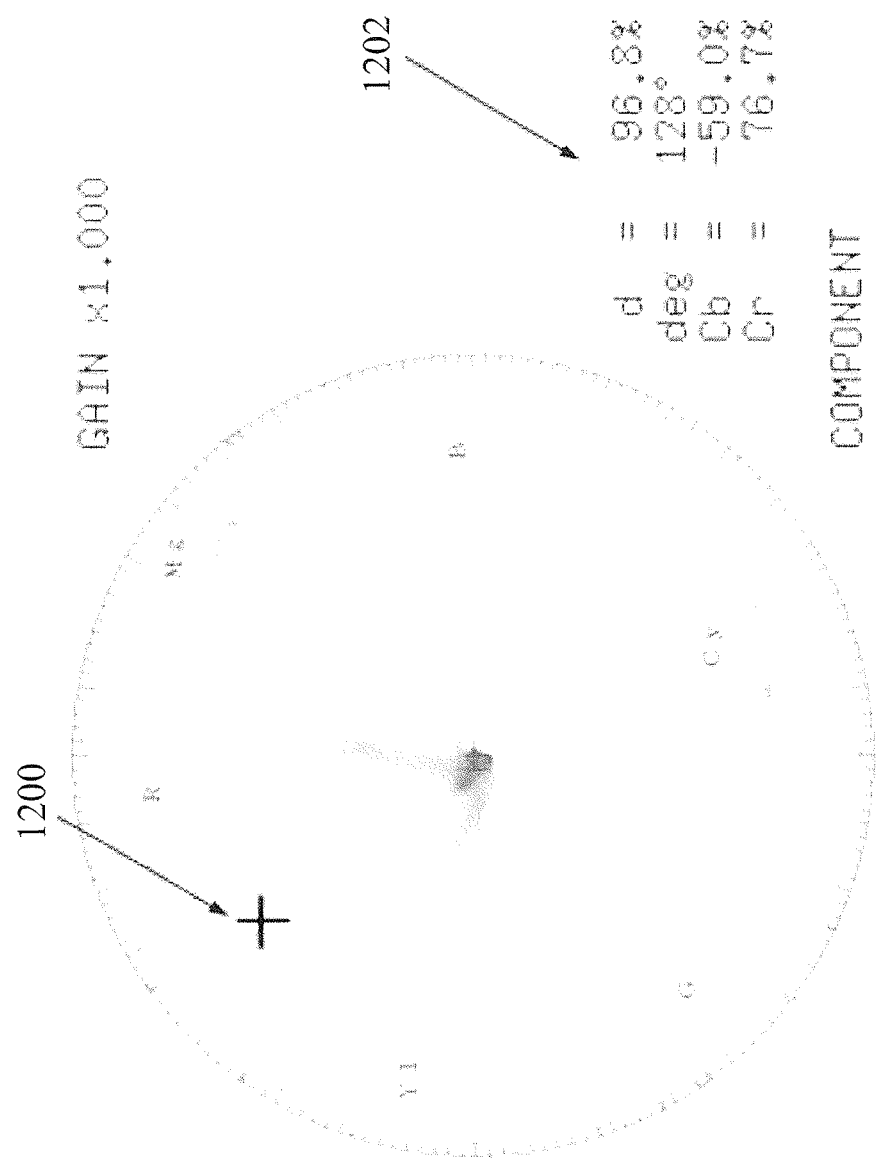
FIG. 12 is a diagram showing an exemplary display that includes only a target marker added to a vector image.

The description of the target marker in connection with FIG. 10 includes only the operation related to the generation of the target marker, but does not include the generation of a vector image as shown in FIG. 5 or FIG. 8. When a target marker 1200 (including the display of target marker values 1202) is to be displayed alone as shown in FIG. 12, the process related to generation of a vector image may be additionally performed, as described with reference to FIG. 1.

While the one or more markers are formed to be cross-shaped in the foregoing embodiments, this is a mere example, and the one or more markers can be formed in another shape, such as an X-shape, dot, or the like. Also, while cursors are used for selecting a position, this is also a mere example, and any other pointer can be used. In some cases, a position within an image may be directly selected using a line number and a sample number. Further, while the user is allowed to select up to three positions in the foregoing embodiments, this is also a mere example, and the user can be allowed to select a greater or lesser number of positions. Further, in the foregoing embodiments, a part of the configuration is implemented by a computer and a computer program, but entire circuitry of the monitor can be configured in hardware instead. Alternatively, the circuits configured in hardware in the foregoing embodiments can be changed such that they are configured by a computer and a computer program.

While several illustrative aspects and embodiments have been described in detail, those skilled in the art will appreciate a variety of modifications, permutations, additions, and sub-combinations. Accordingly, claims set forth in the appended claims and claims that may be included in future are intended to be understood that any such modifications, permutations, additions, sub-combinations, and the like that fall within the true scope are also encompassed by the claims.

The invention claimed is:

1. A method of displaying a marker, comprising:
receiving a first video signal as an input video signal;
selecting a position in a picture display mode image associated with the first video signal,
displaying a first marker at a position corresponding to the selected position in a vector display mode image associated with the first video signal,
placing an additional marker at the position of the first marker on the vector display mode image displayed in association with the first video signal,
receiving a second video signal as the input video signal, and
displaying a second marker in a vector display mode image associated with the second video signal, thereby showing in the vector display mode image, a positional relationship between the first marker and the second marker,
wherein an image portion at a position indicated by the second marker in a picture display mode image associated with the second video signal corresponds to an image portion at the selected position indicated by the first marker in the picture display mode image associated with the first video signal.

2. A method according to claim 1, wherein:
the position in the picture display mode image and the position in the vector display mode image correspond to the same position within each of the first and second video signals.

3. A method according to claim 1, wherein:
the selecting and the displaying are performed on the same monitor apparatus or on different monitor apparatuses.

4. A method according to claim 1, wherein:
the selecting comprises:
receiving the selection of the position in the picture display mode image, the position being selected by use of a cursor; and
generating position data indicative of the selected position, wherein the displaying the first marker comprises determining a position corresponding to the selected position in response to the generated position data.

5. A method according to claim 1, wherein:
the placing the additional marker further comprises displaying values associated with the additional marker, the values associated with the additional marker indicating a position in the vector display coordinates in which the vector display mode image associated with the first video signal is displayed, and
wherein each of the displaying the first marker and displaying the second marker further comprises displaying values associated with an associated marker, the values associated with the associated marker indicating a position in the vector display coordinates in which the vector display mode image is displayed.

6. A non-transitory computer readable storage medium having stored thereon computer readable instructions for causing a computer to execute a method according to claim 1.

7. An apparatus for displaying a marker comprising:
a selector circuit that selects a position in a picture display mode image associated with an input video signal, the picture display mode image being displayed on a display device;
a marker generator circuit that generates a marker at a position corresponding to the selected position in a vector mode display image associated with the input video signal, the display device displaying the vector mode display image and the marker;
an additional marker display circuit that selects a position in vector display coordinates in which the vector display mode image is displayed, and displays an additional marker at the position, wherein the additional marker indicates a position selected by a user in the vector display coordinates in which the vector display mode image is displayed, wherein the additional marker display circuit comprises:

a selector circuit that selects a second position in the vector display mode image, the vector display mode image being displayed on the display device; and an additional marker generator circuit that generates an additional marker to be displayed at the selected second position in the vector display mode image, the display device displaying the vector display mode image, the marker, and the additional marker, wherein a first marker is generated by the marker generator circuit when a first video signal is received as the input video signal, an additional marker being displayed by the additional marker display circuit at the position of the first marker, a second marker being generated by the marker generator circuit when a second video signal is received as the input video signal, thereby showing in the vector display mode image, a positional relationship between the first marker and the second marker; and wherein an image portion at a position indicated by the second marker in the picture display mode image associated with the second video signal corresponds to an image portion at a position indicated by the first marker in the picture display mode image associated with the first video signal.

8. An apparatus according to claim 7, wherein:
the selector circuit and the marker generator circuit are provided in the same monitor apparatus or in different monitor apparatuses.

9. An apparatus according to claim 7, wherein:
the selector circuit comprises:

an input circuit that receives the selection of the position in the picture display mode image; and a generator circuit that generates position data indicative of the selected position, and the marker generator circuit comprises:

a position determination circuit that receives the position data to determine a position corresponding to the selected position; and a marker image generator circuit that generates a marker image representing a marker placed at a position corresponding to the selected position.

10. An apparatus according to claim 7, wherein:
the position in the picture display mode image and the position in the vector display mode image correspond to the same position within the input video signal.

11. An apparatus according to claim 7, wherein:
the additional marker generator circuit further generates values associated with the additional marker, the values associated with the additional marker indicating a position in the vector display coordinates in which the vector display mode image is displayed, the display device displaying the values associated with the additional marker, and the marker generator circuit further generates values associated with the marker, the values associated with the marker indicating a position in the vector display coordinates in which the vector display mode image is displayed, the display device displaying the values associated with the marker.

\* \* \* \* \*